US008289269B2

(12) United States Patent
Nanbu

(10) Patent No.: US 8,289,269 B2
(45) Date of Patent: Oct. 16, 2012

(54) DISPLAY DEVICE AND METHOD FOR DRIVING DISPLAY DEVICE

(75) Inventor: Kohei Nanbu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 311 days.

(21) Appl. No.: 12/452,072

(22) PCT Filed: Jun. 9, 2008

(86) PCT No.: PCT/JP2008/060568
§ 371 (c)(1),
(2), (4) Date: Dec. 15, 2009

(87) PCT Pub. No.: WO2009/013948
PCT Pub. Date: Jan. 29, 2009

(65) Prior Publication Data
US 2010/0134525 A1    Jun. 3, 2010

(30) Foreign Application Priority Data

Jul. 20, 2007    (JP) ................................. 2007-190105

(51) Int. Cl.
*G09G 3/36*    (2006.01)
(52) U.S. Cl. ........................................ 345/102; 345/204
(58) Field of Classification Search .................. 345/690, 345/102, 204
See application file for complete search history.

(56) References Cited

U.S. PATENT DOCUMENTS 6,348,910 B1    2/2002    Yamamoto et al.
7,023,145 B2 *  4/2006    Hwang et al. ................. 315/276
2002/0036608 A1 * 3/2002    Hirakata et al. ................. 345/87
2004/0125071 A1 * 7/2004    Kim et al. ...................... 345/102
2007/0052372 A1    3/2007    Ryu
2010/0134526 A1    6/2010    Nanbu

FOREIGN PATENT DOCUMENTS

| JP | 10-319865 | 12/1988 |
| JP | 11-121188 | 4/1999 |
| JP | 2000-82592 | 3/2000 |

(Continued)

OTHER PUBLICATIONS

International Search Report dated Aug. 19, 2008.

(Continued)

*Primary Examiner* — Stephen Sherman
(74) *Attorney, Agent, or Firm* — Harness, Dickey & Pierce

(57) ABSTRACT

One embodiment of the present invention discloses a transmissive display device including a display panel, a backlight including a plurality of fluorescent tubes, an inverter section that supplies a driving voltage to the backlight, and an inverter control section that controls whether to drive or stop the inverter section and stops the inverter section when at least one of the fluorescent tubes is not lighting. The display device includes a mode determination section that determines whether a driving mode of the display device is a normal mode or a maintenance mode. Upon receiving, from the mode determination section, a signal indicating that the drive mode is the maintenance mode, after having stopped the inverter section due to a fact that at least one of the plurality of fluorescent tubes is not lighting, the inverter control section drives the inverter section again. Such a configuration makes it possible to, in a display device in which a backlight including a plurality of fluorescent tubes is used, make maintenance work more efficient by identifying a failed fluorescent tube while the backlight is not lighting.

10 Claims, 14 Drawing Sheets

FOREIGN PATENT DOCUMENTS

| | | |
|---|---|---|
| JP | 2002-134293 | 3/2002 |
| JP | 2002-131746 | 5/2002 |
| JP | 2003-121845 | 4/2003 |
| JP | 2004-053988 | 2/2004 |
| JP | 2007-147956 | 6/2007 |
| JP | 2007-156157 | 6/2007 |
| JP | 2007-171258 | 7/2007 |

OTHER PUBLICATIONS

Office Action for corresponding U.S. Appl. No. 12/452,284 dated Jan. 6, 2012.

Office Action for corresponding U.S. Appl. No. 12/452,284 dated May 1, 2012.

English version of ISR.

* cited by examiner

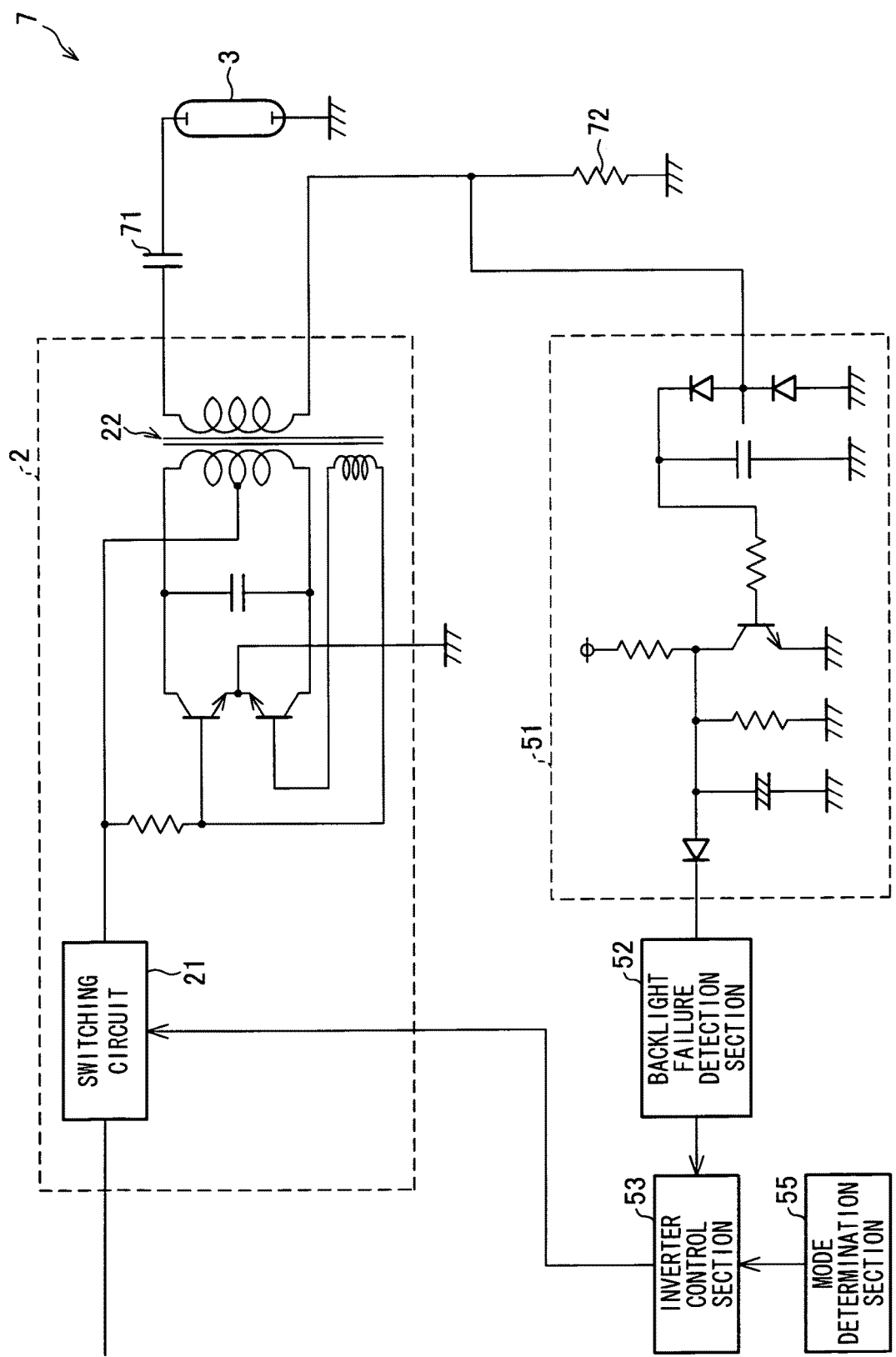
F I G. 3

DISPLAY DEVICE AND METHOD FOR DRIVING DISPLAY DEVICE

TECHNICAL FIELD

The present invention relates to a display device such as a transmissive liquid crystal display device and a method for driving a display device.

BACKGROUND ART

There are various types of color displays that have been in practical use. Thin displays are classified broadly into (i) self-luminous displays such as PDPs (plasma display panels) and (ii) nonluminous displays typified by LCDs (liquid crystal displays). A known example of an LCD, i.e., a nonluminous display is a transmissive LCD having a backlight disposed on the back surface side of a liquid crystal panel.

FIG. 14 is a cross-sectional view illustrating a typical structure of a transmissive LCD. This transmissive LCD has a backlight 110 disposed on the back surface side of a liquid crystal panel 100. The liquid crystal panel 100 includes: a pair of transparent substrates 101 and 102; a liquid crystal layer 103 disposed between the transparent substrates 101 and 102; and polarizing plates 104 and 105 provided on the respective outer surfaces of the transparent substrates 101 and 102. The liquid crystal panel 100 further includes a color filter 106 so as to carry out a color display.

Although not illustrated in FIG. 14, each of the transparent substrates 101 and 102 has an electrode layer and an alignment film which are on its inner surface. In response to controlling of a voltage that is applied to the liquid crystal layer 103, the amount of light that travels through the liquid crystal panel 100 is controlled in individual pixels. That is, the transmissive LCD carries out a display control by controlling the amount of light, emitted from the backlight 110, that travels through the liquid crystal panel 110.

A white backlight, containing the wavelengths of three colors RGB necessary for a color display, is mainly used as the backlight 110. The backlight 110 is combined with the color filter 106 so as to adjust the transmittance of light that transmits each of the colors RGB. This makes it possible to arbitrarily set the luminance and hue of a pixel. It should be noted that some backlight 110 includes light sources for the respective colors RGB.

For example, according to the above LCD, the liquid crystal panel 110, including pixels corresponding to RGB regions of the color filter 106, has a shutter function. The shutter function controls the transmittance of light that travels through each of the pixels in accordance with the display information to be outputted. Specifically, the shutter function controls the transmittance of the light that travels through each of the pixels by controlling the transmittance by a predetermined step which falls within the range of 0 to 100%. This causes the intensity of the light that travels through each of the pixels to be controlled. Theoretically, in cases where 100% of the light emitted from the backlight 110 is transmitted, the intensity of a color component corresponding to the light emitted from the backlight is outputted from a corresponding pixel as it is, thereby obtaining a maximum luminance. On the other hand, a transmittance of 0% causes a black display. According to the ordinary transmissive LCD that is configured so that the liquid crystal panel 110 has the shutter function causing a display control, the backlight 110 continues to emit light at a certain level of luminance.

In such a backlight, fluorescent tubes (such as cold-cathode tubes) are mainly employed as a light source thereof. A fluorescent tube is structured to have electrodes at both inner ends thereof, and as such, needs to be made higher in discharge lighting voltage, especially when it is applied to a large-sized liquid crystal panel. Such a high discharge lighting voltage is achieved by a structure in which a high voltage boosted by the output transformer of an inverter is applied to an electrode of the fluorescent tube via a capacitor.

There are no problems as long as a fluorescent tube performs a lighting operation properly. However, once the fluorescent tube has failed in such a structure that a high voltage is applied to the fluorescent tube, there occur various problems in addition to stoppage of lighting. Examples of a failure in the fluorescent tube include the life time of the fluorescent tube, breakage of the fluorescent tube, a bad electrical contact of a connector via which the inverter and the electrode of the fluorescent tube are connected with each other, and disconnection of a lead wire. Upon occurrence of such a failure in the fluorescent tube, the output of the transformer is put in an unloaded condition, whereby the output voltage of the transformer is abnormally increased, posing various dangers such as discharge, firing, and an electric shock to an operator.

Proposed in view of this is a technique for preventing an abnormal increase in output voltage in the case of a failure in a fluorescent tube. Patent Literature 1 discloses an example of such a technique. Specifically, a tube current detection circuit that detects, in accordance with a tube current flowing through a fluorescent tube, whether the fluorescent tube is lighting or not lighting is provided, and in the absence of a tube current, a protection circuit that shuts off supply of power to an inverter circuit and forcibly stops output of the inverter circuit is activated. This makes it possible to prevent an abnormal increase in transformer output voltage.

CITATION LIST

Patent Literature 1
Japanese Patent Application Publication, Tokukai, No. 2002-134293 A (Publication Date: May 10, 2002)

SUMMARY OF INVENTION

However, in a conventional liquid crystal display device of Patent Literature 1 or the like, for example, in cases where one of a plurality of fluorescent tubes constituting a backlight has blown due to the life time or the like, the tube current becomes zero, whereby the supply of power to the inverter circuit is shut off. As a result, all the fluorescent tubes stop lighting, and the liquid crystal panel stops displaying anything. In such a state, usually, the user shuts off the power supply once and then turns on power again, whereby the power supply is put in an on-state. However, since the protection circuit is still working, the supply of power to the inverter circuit is not resumed, and the liquid crystal panel remains to display nothing. Moreover, in the end, when the number of consecutive times the power supply is turned on reaches a predetermined value, even the power supply becomes unable to be in an on-state, because the protection circuit usually has a counter function.

In such a case where a fluorescent tube has failed due to a blowout or the like, the liquid crystal panel stops displaying anything. This makes it difficult for the user or operator to identify a blown fluorescent tube in performing an operation for replacing a failed fluorescent tube. In particular, since a recent increase in size of a display panel has been accompanied by an increase in the number of fluorescent tubes constituting a backlight, the amount of time required to replace one fluorescent tube with another is undesirably increased.

The present invention has been made in view of the foregoing problems, and it is an object of the present invention to, in a display device in which a backlight constituted by a plurality of fluorescent tubes is used, make maintenance work more efficient by identifying a failed fluorescent tube while the backlight is not lighting.

In order to solve the foregoing problems, a display device according to the present invention is a display device including (i) a transmissive display panel, (ii) a backlight including a plurality of fluorescent tubes that irradiate the display panel with light, (iii) an inverter section that supplies a driving voltage to the backlight, and (iv) a control section that controls whether to drive or stop the inverter section and that stops the inverter section when at least one of the plurality of fluorescent tubes is not lighting, in which a display is carried out by controlling an amount of transmission of the light with which the display panel is irradiated by the backlight, the display device, further including: a mode determination section that determines whether a driving mode of the display device is a normal mode in which to indicate a normal state of the display device or a maintenance mode in which to carry out maintenance work on the display device, upon receiving, from the mode determination section, a signal indicating that the driving mode is the maintenance mode, after having stopped the inverter section due to a fact that at least one of the plurality of fluorescent tubes is not lighting, the inverter control section drives the inverter section again.

As described above, a method according to the present invention for driving a display device is a method for driving a display device, the display device including (i) a transmissive display panel, (ii) a backlight including a plurality of fluorescent tubes that irradiates the display panel with light, and (iii) an inverter section that supplies a driving voltage to the backlight, in which a display is carried out by controlling an amount of transmission of the light with which the display panel is irradiated by the backlight, the method including the steps of: (a) controlling whether to drive or stop the inverter section, and of stopping the inverter section when at least one of the plurality of fluorescent tubes is not lighting; and (b) determining whether a driving mode of the display device is a normal mode in which to indicate a normal state of the display device or a maintenance mode in which to carry out maintenance work on the display device, in the step (a), when a signal indicating, as determined in the mode determining step, that the driving mode is the maintenance mode is received after the inverter section has been stopped due to a fact that at least one of the plurality of fluorescent tubes is not lighting, the inverter section being driven again.

According to the foregoing configuration, in cases where a shift in driving mode has been made to the maintenance mode after stoppage of the inverter section due to a failure in the backlight, the inverter section is driven again, whereby all the fluorescent tubes start lighting except for the one that is not lighting.

For example, in cases where one of the plurality of fluorescent tubes has blown while the display device is being driven in the normal mode, the inverter section is stopped, whereby all the fluorescent tubes stop lighting and the display panel stops displaying anything. At this point, the user or operator switches from the normal mode to the maintenance mode to carry out maintenance work or, specifically, an operation for identifying and replacing the blown fluorescent tube, the inverter section is driven again, whereby all the normal fluorescent tubes start lighting except for the blown fluorescent tube. This enables the user or operator to easily identify the blown fluorescent tube with his/her eyes. This makes it unnecessary to inspect the plurality of fluorescent tubes by removing them or inspect them with use of a measuring instrument, thus enabling efficient maintenance work.

Further, in the maintenance work, the failed fluorescent tube can be visually identified; therefore, the work does not need to be carried out with hands touching the components of the backlight. For this reason, conventional dangers such as an electric shock can be avoided.

The display device is preferably configured to further include: a lighting state detection section that detects a lighting state of the backlight; a backlight failure detection section that judges, in accordance with a detected result of the lighting state detection section, whether or not the backlight has failed, and that outputs a signal according to a judged result; and a panel control section that performs display control of the display panel in accordance with the judged result of the backlight failure detection section and a determined result of the mode determination section, wherein: when at least one of the plurality of fluorescent tubes is not lighting, the backlight failure detection section outputs a backlight failure signal indicating that the backlight has failed; and upon receiving the backlight failure signal from the backlight failure detection section and the signal indicative of the maintenance mode from the mode determination section, the panel control section controls the display panel so that the display panel displays a white display screen image.

According to the foregoing configuration, in cases where the inverter section is driven again in the maintenance mode at the time of a failure in the backlight, the display panel displays a white display screen image, whereby a black line indicative of the location of the failed fluorescent tube appears in the white display screen image. This makes it possible to identify the failed fluorescent tube among the plurality of fluorescent tubes.

The color of the display screen image is not limited to white, and only needs to be such a color as gray, red, or blue that the failed fluorescent tube can be identified.

The display device is preferably configured to further include: a lighting state detection section that detects a lighting state of the backlight; a backlight failure detection section that judges, in accordance with a detected result of the lighting state detection section, whether or not the backlight has failed, and that outputs a signal according to a judged result; a notification section that notifies outside of the lighting state of the backlight; and a notification control section that gives a notification command to the notification section in accordance with an output signal supplied from the backlight failure detection section so as to cause the notification section notify outside of the lighting state of the backlight, when at least one of the plurality of fluorescent tubes is not lighting, the backlight failure detection section outputting a backlight failure signal indicating that the backlight has failed, and upon receiving the backlight failure signal from the backlight failure detection section, the notification control section sending, to the notification section, a signal for causing the notification section to notify outside that the backlight has failed.

On receipt of the backlight failure signal, the foregoing configuration notifies outside that the backlight has failed. This allows the user or operator to surely grasp whether or not the backlight has failed, thus enabling more efficient maintenance work.

The display device is preferably configured to further include: a lighting state detection section that detects a lighting state of the backlight; a backlight failure detection section that judges, in accordance with a detected result of the lighting state detection section, whether or not the backlight has failed, and that outputs a signal according to a judged result;

a notification section that notifies outside of the lighting state of the backlight and whether the driving mode is the normal mode or the maintenance mode; and a notification control section that gives a notification command to the notification section in accordance with an output signal supplied from the backlight failure detection section so as to cause the notification section to notify outside of the lighting state of the backlight and whether the driving mode is the normal mode or the maintenance mode, when at least one of the plurality of fluorescent tubes is not lighting, the backlight failure detection section outputting a backlight failure signal indicating that the backlight has failed; and upon receiving the backlight failure signal from the backlight failure detection section, the notification control section sending, to the notification section, a signal for causing the notification section to notify outside that the backlight has failed, and when the driving mode is the maintenance mode, the notification control section further sending, to the notification section, a signal for causing the notification section to indicate that the driving mode is the maintenance mode.

On receipt of the backlight failure signal, the foregoing configuration notifies outside that the backlight has failed, and in cases where the driving mode is the maintenance mode, the foregoing configuration notifies outside that the driving mode is the maintenance mode is made. This allows the user or operator to confirm that his/her driving-mode switching operation has been surely accepted. In particular, since it can be confirmed that a shift has been surely made to the maintenance mode at the time of a failure in the backlight, an improvement in safety of maintenance work can be achieved.

The display device is preferably configured such that the notification section is constituted by an externally viewable indicator display.

The display device is preferably configured such that the notification section is constituted by a speaker that produces a sound by which the lighting state of the backlight can be identified.

The display device is preferably configured such that the lighting state detection section judges the lighting state of the backlight by detecting an output voltage of a transformer in the inverter section, the output voltage being supplied to the backlight.

The display device is preferably configured such that the lighting state detection section judges the lighting state of the backlight by detecting an amount of light with which the display panel is irradiated by the backlight.

The display device is preferably configured such that upon receiving, from the mode determination section, the signal indicating that the driving mode is the maintenance mode, the inverter control section drives the inverter section again so that the inverter section works only for a predetermined period of time thereafter.

The display device is preferably configured such that the display device is a liquid crystal display device.

For a fuller understanding of the nature and advantages of the invention, reference should be made to the ensuing detailed description taken in conjunction with the accompanying drawings.

BRIEF DESCRIPTION OF DRAWINGS

FIG. 3 is a circuit diagram schematically illustrating the configuration of a backlight unit in the liquid crystal display device.

REFERENCE SIGNS LIST

Figure 1:
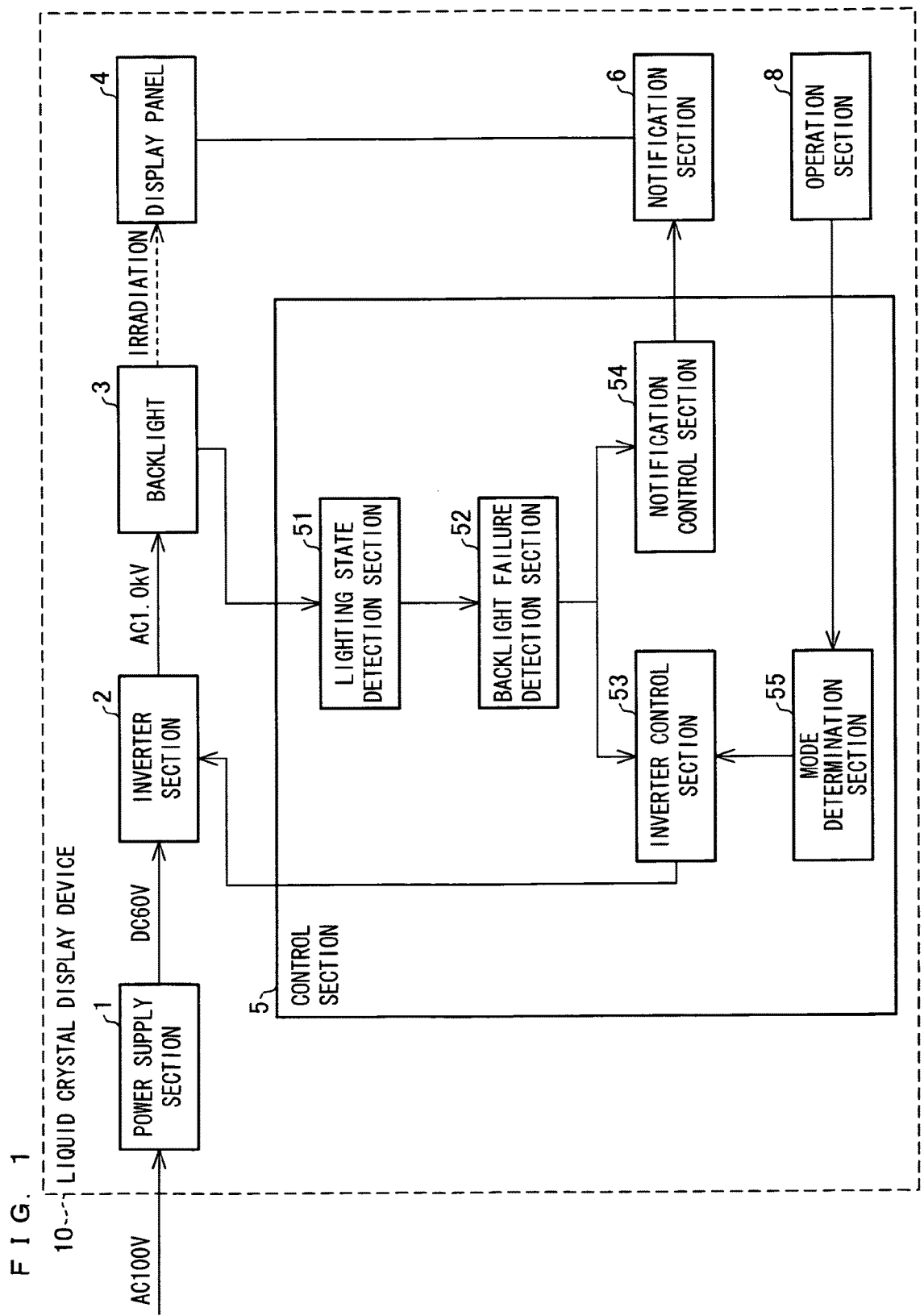
FIG. 1 is a block diagram schematically illustrating the configuration of a liquid crystal display device according to the present embodiment.
Figure 2:
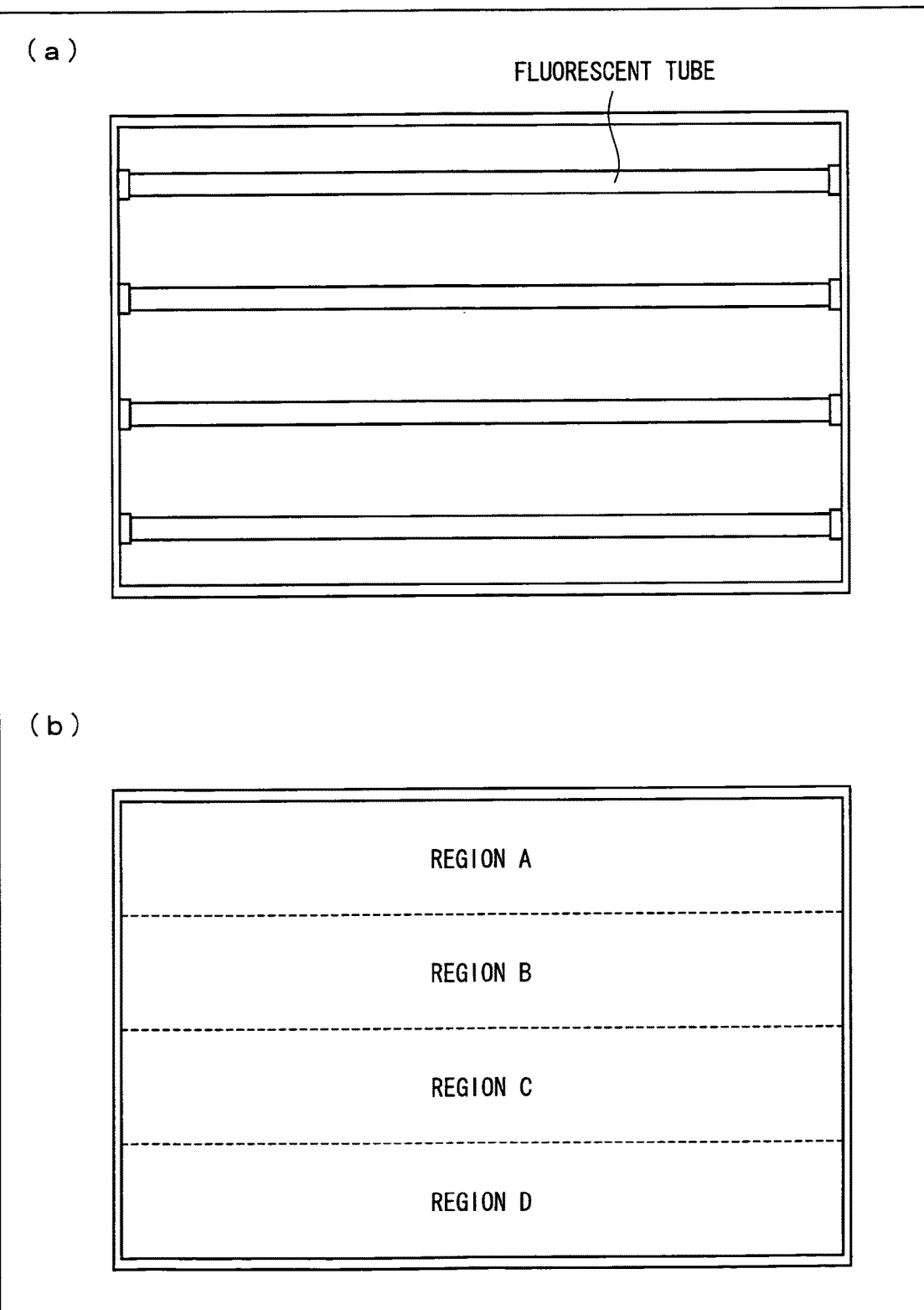
FIG. 2 schematically illustrates the configuration of a backlight in which fluorescent tubes are used, (a) of FIG. 2 illustrating an example of arrangement of the fluorescent tubes in the backlight, (b) of FIG. 2 illustrating an example of division of regions for the backlight in accordance with the example of arrangement of the fluorescent tubes.

1 Power supply section
2 Inverter section
3 Backlight
4 Display panel
5 Control section
51 Lighting state detection section
52 Backlight failure detection section
53 Inverter control section
54 Notification control section
55 Mode determination section
56 Panel control section
6 Notification section
7 Backlight unit
8 Operation section
10 Liquid crystal display device (display device)

DESCRIPTION OF EMBODIMENTS

One embodiment of the present invention is described below with reference to FIGS. 1 through 13. In the present embodiment, a liquid crystal display device is described as an example of a nonluminous display device that performs a display by controlling transmittance with a backlight provided on the back surface side of a display panel. First, the following description schematically deals with a configuration of a liquid crystal display device in accordance with the present embodiment with reference to FIG. 1.

As illustrated in FIG. 1, a liquid crystal display device 10 includes a power supply section 1, an inverter section 2, a backlight 3, a display panel 4, a control section 5, a notification section 6, and an operation section 8. Other members constituting the liquid crystal display device 10 such as a gate driving section, a source driving section, a common electrode driving section, and a controlling section having an operational section have conventionally well-known functions. As such, the other members are neither illustrated nor described below.

The power supply section 1 converts an externally supplied AC voltage into an inverter-driving DC voltage. Specifically, the power supply section 1 converts AC 100 V into DC 60 V, for example.

The inverter section 2 is a conversion circuit that converts, into a backlight-driving AC voltage, the DC voltage supplied from the power supply section 1.

The backlight 3 is a light source that emits light in accordance with the driving voltage supplied from the inverter section 2, and irradiates the display panel 4 with the light.

A plurality of fluorescent tubes (e.g., cold-cathode tubes) are often employed as a light source of the backlight 3 employed in the liquid crystal display device 10. For example, in cases where fluorescent tubes are provided in a backlight in which fluorescent tubes are employed as a light source (see (a) of FIG. 2), regions for the backlight can be divided in accordance with the arrangement of the fluorescent tubes (see (b) of FIG. 2).

According to the present invention, the number of the regions for the backlight is not limited to a specific one. Shapes of the respective regions are not also limited to a specific one. Moreover, the regions for the backlight are not necessarily identical in size and shape.

According to such a configuration where regions are secured for a backlight, it is necessary to control the emission luminance of each of the regions. The following briefly describes a specific controlling method.

For example, in cases where a light source that is used as the backlight is a light source whose emission luminance can be controlled in accordance with a supplied voltage, it is possible to employ a configuration in which different voltage supplying systems are employed for supplying voltages to the respective regions so that the respective regions have their own necessary emission luminance. Alternatively, in cases where a light source that is used as the backlight is a light source whose emission luminance can be controlled by controlling an emission period of the light source, it is possible to employ a configuration in which control signals for controlling emission periods of the respective regions are separately supplied.

Figure 14:
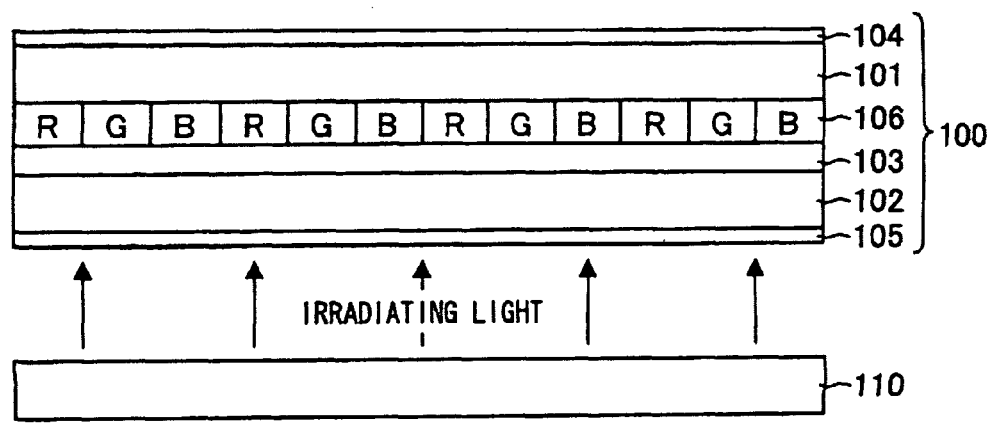
FIG. 14 is a cross-sectional view illustrating a typical structure of a transmissive LCD.

The display panel 4 is a typical transmissive liquid crystal panel as illustrated, for example, in FIG. 14, and carries out display control by controlling a voltage that is applied to the liquid crystal layer so that the amount of the light, emitted from the backlight 3, which travels through the liquid crystal panel is controlled for each pixel.

The operation section 8, disposed near the display panel 4, accepts various operations from a user or operator. Specific examples of the various operations include an operation for shifting from a normal mode to a maintenance mode in carrying out maintenance work on the backlight 3 and an operation for changing various display settings. The operation section 8 may be constituted by a remote controller.

The control section 5, including a CPU (central processing unit), controls operations of respective various components of the liquid crystal display device 10 comprehensively. The control section 5 includes a lighting state detection section 51, a backlight failure detection section 52, an inverter control section 53, a notification control section 54, a mode determination section 55, and a panel control section 56.

The lighting state detection section 51 detects a lighting state of the backlight 3, and then outputs a detected result to the backlight failure detection section 52. Specifically, the lighting state detection section 51 detects whether the backlight 3 is lighting or not, and then outputs a signal indicative of the detected result to the backlight failure detection section 52. The configuration of the lighting state detection section 51 will be described later in more concrete terms.

In accordance with the signal, received from the lighting state detection section 51, which indicates that the backlight is lighting or not lighting, the backlight failure detection section 52 judges whether or not the backlight 3 has failed, and then outputs a judged result to the inverter control section 53 and the notification control section 54.

The notification control section 54 controls the notification section 6 in accordance with the signal received from the backlight failure detection section 52. Specifically, the notification control section 54 commands the notification section 6 to notify outside of the lighting state of the backlight 3.

The mode determination section 55 determines whether a driving mode accepted from the user or operator through the operation section 8 is the normal mode or the maintenance mode, and then outputs a determined result of to the inverter control section 53.

It should be noted here that the driving mode is set to either the normal mode or the maintenance mode. The normal mode is a state in which an ordinary user who uses the liquid crystal display device 10 carries out a normal operation, and includes a state in which the backlight 3 is working normally and a state in which a failure in the backlight 3 causes the display panel 4 to stop displaying anything. Meanwhile, the maintenance mode is a mode to which a shift is made from the normal mode by carrying out a predetermined operation on the operation section 8, and is used mainly when the user or operator checks for a failure or carries out maintenance work such as repair. The driving mode can be switched using a well-known technique; for example, the normal mode and the maintenance mode can be switched from each to the other by simultaneously pressing down "+" and "−" buttons of volume buttons (operation section) disposed on the display panel 4. Alternatively, a button (operation section) for the maintenance mode may be provided. Alternatively, in cases where the power supply of the liquid crystal display device 10 is in an off-state, a shift to the maintenance mode may be made by turning on the power supply while pressing down one or more keys of a plurality of keys provided in the operation section 8.

In accordance with the signal received from the backlight failure detection section 52 and the determination result received from the mode determination section 55, the inverter control section 53 controls whether to drive/stop the inverter section 2. The configuration of the inverter control section 53 will be described later in more concrete terms.

The notification section 6, provided near the display panel 4, notifies outside of the lighting state of the backlight 3 and a state of failure in and a state of setting in the liquid crystal display device 10. Examples of specific notification means include a configuration in which an indicator display is performed by an externally viewable LED, a configuration in which a message is displayed on a notification section 6 having a display function, and a configuration in which an externally identifiable sound is produced.

An example of the configuration of the lighting state detection section 51 and an example of the configuration of the inverter control section 53 are described in more concrete terms with reference to FIG. 3. FIG. 3 is a block diagram schematically illustrating the configuration of a backlight unit 7 including the inverter section 2, the lighting state detection section 51, the inverter control section 53, and the backlight 3. As illustrated in FIG. 3, the backlight unit 7 includes: a switching circuit 21 that switches on/off a driving power supply of the inverter section 2; an inverter transformer 22, a ballast capacitor 71; the backlight 3; a resistor (tube current detection resistor) 72 for detecting a tube current that flows while the backlight 3 is lighting; the lighting state detection section 51, which detects a lighting state of the backlight 3 by detecting a voltage across the tube current detection resistor 72; the backlight failure detection section 52; and the inverter control section 53.

While the backlight 3 is lighting normally, an alternating voltage is generated across the tube current detection resistor 72. On the other hand, in cases where the backlight 3 stops lighting, no current flows between the backlight 3 and the inverter transformer 22 any longer. This causes no alternating voltage to be generated across the tube current detection resistor 72. Thus, it is possible that the lighting state detection section 51 detects a lighting state of the backlight 3 by measuring a voltage across the tube current detection resistor 72.

Note that the lighting state detection section 51 is not limited to such a configuration, provided that it is possible to determine whether the backlight is lighting (normal lighting state) or not lighting (abnormal lighting state). Consequently, another configuration of the lighting state detection section 51 can be realized by a light-receiving element such as a PD (photodiode). The light-receiving element is provided near the backlight 3 so as to receive the light emitted from the backlight 3 and output a signal which varies according to an amount of light thus received. This makes it possible to detect the lighting state of the backlight 3 in accordance with the amount of light emitted by the backlight 3.

As described above, the inverter control section 53 controls, in accordance with the lighting state of the backlight 3, whether to drive or stop the inverter section 2. Specifically, upon receiving, from the backlight failure detection section 52, a signal indicating that the backlight 3 has failed, the inverter control section 53 controls the switching circuit 21 so that the inverter section 2 is stopped, thus preventing an unloaded condition of a transformer output due to a failure in the backlight 3 from causing an abnormal rise in transformer output voltage. For example, the inverter control section 53 sends a Low signal to the switching circuit 21 so that the supply of power to the inverter section 2 is stopped.

Once the inverter section 2 has been stopped, the supply of a voltage required for the backlight 3 to light is stopped, whereby the display panel 4 stops displaying anything. For this reason, even when only one of the plurality of fluorescent tubes constituting the backlight 3 has failed, all the fluorescent tubes stop lighting. This makes it difficult to identify the failed fluorescent tube.

Accordingly, in addition to the above configuration, the present invention is characterized mainly by driving the inverter section 2 again only in cases where a particular condition is satisfied and forcing the normal fluorescent tubes to light. In the liquid crystal display device 10 of the present embodiment, the particular condition is an occasion when the aforementioned driving mode has shifted from the normal mode to the maintenance mode.

That is, the liquid crystal display device 10 according to the present embodiment is configured such that upon receiving an instruction to shift from the normal mode to the maintenance mode, in cases where a failure in the backlight 3 has caused the inverter section 2 to be stopped, the inverter control section 53 drives the inverter section 2 again and forces the fluorescent tubes to light. Specifically, upon receiving a signal indicative of the maintenance mode from the mode determination section 55, the inverter control section 53 sends a High signal to the switching circuit 21 so that the supply of power to the inverter section 2 is resumed.

This results in lighting of normal fluorescent tubes other than a failed fluorescent tube such as a blown one. This makes it possible to easily identify the failed fluorescent tube. In cases where a failure in the backlight 3 has caused the display panel 4 to stop displaying anything, the user or operator carries out an operation for shifting to the maintenance mode to identify the failed fluorescent tube with his/her eyes. This makes it possible to instantaneously identify the failed fluorescent tube, thus making it unnecessary to keep the maintenance mode for a long period of time. For this reason, the period of time during which the transformer output voltage rises can be made shorter, and an inspection does not need to be carried out with hands touching the components of the backlight 3. Therefore, the conventional dangers can be avoided.

In order to improve safety in the maintenance mode, the liquid crystal display device 10 may be equipped with a timer function. Specifically, the liquid crystal display device 10 may be configured such that at the time of the maintenance mode (i.e., upon receiving, from the mode determination section 55, a signal indicating that the driving mode is the maintenance mode), the inverter control section 53 drives the inverter section 2 so that the inverter section 2 works only for a predetermined period of time, e.g., for 1 to 2 seconds.

Furthermore, the liquid crystal display device 10 may be configured such that the inverter control section 53 controls the value of a voltage that is supplied from the inverter section 2 to the backlight 3 at the time of the maintenance mode. Specifically, when a shift has been made to the maintenance mode, the voltage is set to such a low value that the normal fluorescent tubes can light. This makes it possible to identify the blown fluorescent tube, and to improve safety.

Figure 4:
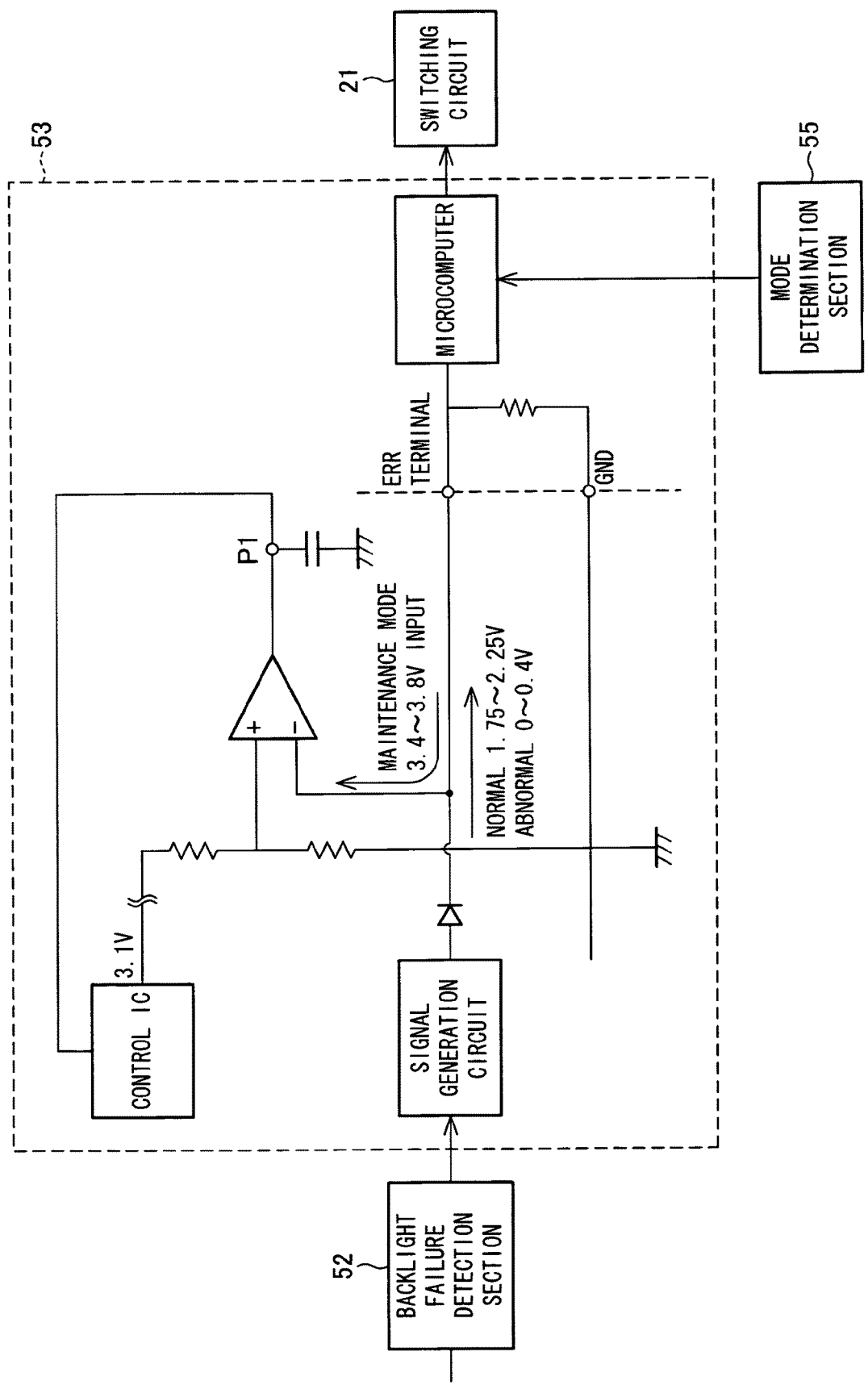
FIG. 4 is a circuit diagram schematically illustrating the configuration of an inverter control section in the liquid crystal display device.

In the following, an example of the configuration of the inverter control section 53 is described in concrete terms with reference to FIG. 4. FIG. 4 is a circuit diagram schematically illustrating the configuration of the inverter control section 53.

According to the configuration shown in FIG. 4, in cases where the backlight 3 is normal, a signal generation circuit generates a normal signal (1.75 V to 2.25 V) and sends it to a microcomputer through an ERR terminal. Upon receiving the normal signal, the microcomputer sends a High signal to the switching circuit 21. Upon receiving the High signal, the switching circuit 21 is turned on, and power is supplied to the inverter section 2, whereby the inverter section 2 is driven.

On the other hand, in cases where the backlight has failed, the signal generation circuit generates an abnormal signal (0 V to 0.4 V) and sends it to the microcomputer through the ERR terminal. Then, upon receiving the abnormal signal, the microcomputer sends a Low signal to the switching circuit 21. Upon receiving the Low signal, the switching circuit 21 is turned off, whereby the inverter section 2 is stopped. In this way, whether to drive the inverter section 2 can be controlled in accordance with whether the backlight is normal/failed.

At this point, in cases where a shift has been made to the maintenance mode in face of a failure in the backlight, the microcomputer receives a signal indicative of the maintenance mode from the mode determination section 55 and sends a signal of 3.4 V to 3.8 V to the ERR terminal, whereby the abnormal state is invalidated. Then, the microcomputer sends a High signal to the switching circuit 21. Upon receiving the High signal, the switching circuit 21 is turned on, whereby the inverter section 2 is driven again. This makes it possible, even when the backlight has failed, to force normal fluorescent tubes to light.

(Operation Example 1 of the Liquid Crystal Display Device 10)

Figure 5:
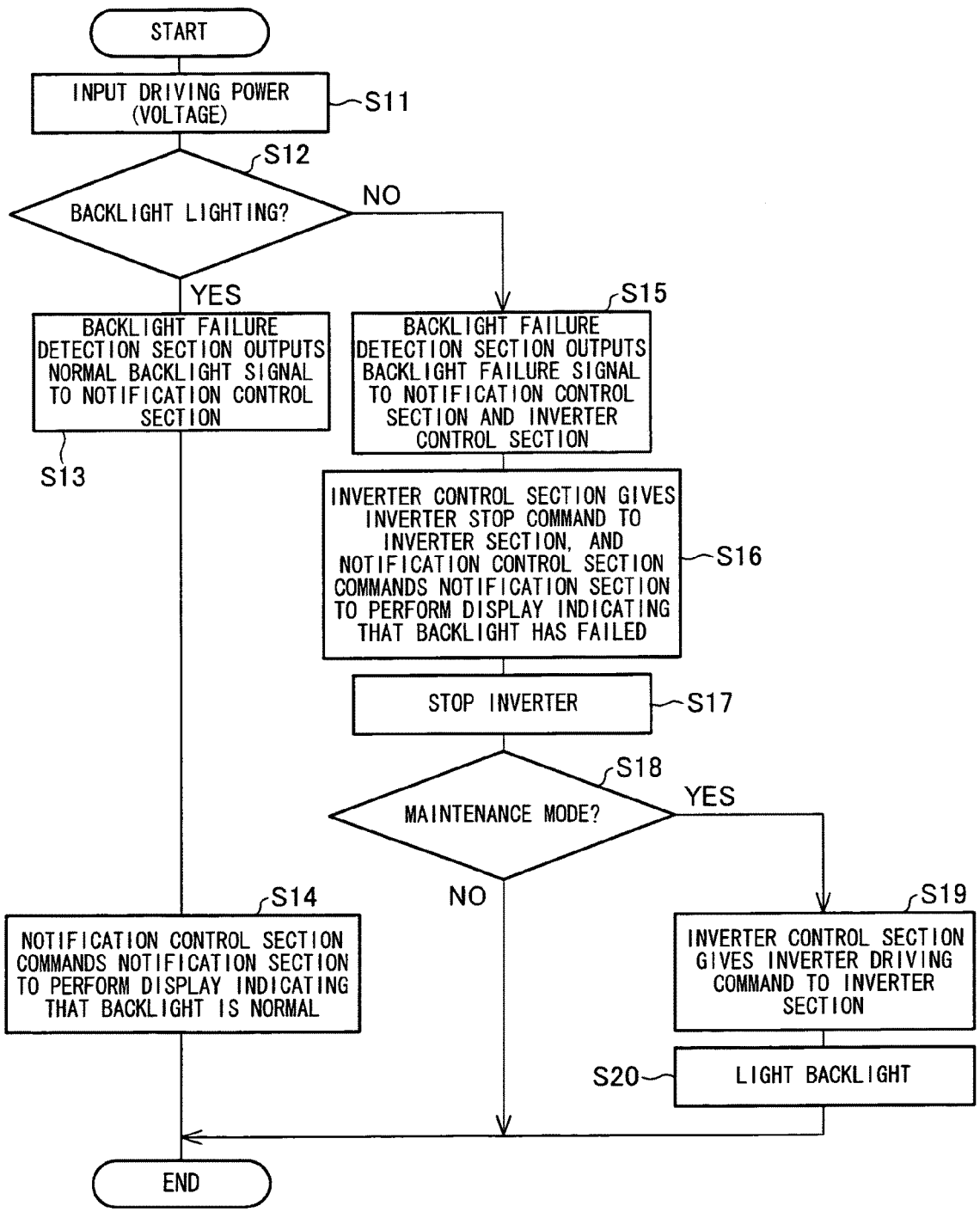
FIG. 5 is a process flow chart showing an example of operation (Operation Example 1) of the liquid crystal display device.

The following deals with the functions of the respective sections of the liquid crystal display device 10 with reference FIGS. 1 and 5 together with their specific operations. FIG. 5 is a process flow chart showing an operation that the liquid crystal display device 10 performs.

First, in Step 11 (hereinafter abbreviated as in "S11") of FIG. 5, after the power supply section 1 is externally supplied with AC 100 V, the power supply section 1 supplies the inverter section 2 with driving electric power (voltage) which causes the inverter section 2 to be driven, and the inverter section 2 converts the voltage into a backlight-driving alternating voltage and outputs it to the backlight 3. Next, the lighting state detection section 51 detects whether the backlight 3 is lighting or not lighting, and then outputs a detected result to the backlight failure detection section 52 (S12).

Upon receiving, from the lighting state detection section 51, a signal indicating that the backlight 3 is lighting (YES in S12), the backlight failure detection section 52 determines that the backlight 3 is not failed but normal, and then outputs, to the notification control section 54, a signal (normal backlight signal) indicating that the backlight 3 is normal (S13). Upon receiving the normal backlight signal, the notification control section 54 commands the notification section 6 to notify outside that the backlight 3 is lighting (S14). At this point, for example, the notification control section 54 causes an LED indicator (notification section 6) provided in the display panel 4 to carry out a lighting process for indicating that the backlight 3 is normal, more specifically, a process for "lighting the LED indicator in blue". Alternatively, the notification control section 54 causes a notification section 6 having a display function to display a message indicating that the backlight 3 is lighting normally. This makes it possible to externally confirm that the backlight 3 is lighting normally.

On the other hand, upon receiving, from the lighting state detection section 51, a signal indicating that the backlight 3 is not lighting (NO in S12), the backlight failure detection section 52 determines that the backlight 3 has failed, and then outputs, to the notification control section 54 and the inverter control section 53, a signal (backlight failure signal) indicating that the backlight has failed (S15). Upon receiving the backlight failure signal, the notification control section 54 commands the notification section 6 to notify outside that the backlight 3 is not lighting (S16). At this point, for example, the notification control section 54 causes the LED indicator provided in the display panel 4 to carry out a lighting process for indicating that the backlight 3 has failed, more specifically, a process for "blinking the LED indicator in red". Alternatively, the notification control section 54 causes the notification section 6 having a display function to display a message indicating that the backlight 3 has failed. This makes it possible to externally confirm that the backlight 3 has failed. Further, upon receiving the backlight failure signal, the inverter control section 53 commands the inverter section 2 to be stopped (S16). Upon receiving the control signal from the inverter control section 53, the inverter section 2 is stopped (S17). Specifically, the supply of power from the inverter section 2 to the backlight 3 is stopped.

Then, the mode determination section 55 determines whether a driving mode accepted from the user or operator through the operation section 8 is the normal mode or the maintenance mode, and then outputs a determined result to the inverter control section 53 (S18). In cases where the driving mode is the normal mode (NO in S18), the inverter control section 53 performs no process on the inverter section 2, whereby the process ends with the inverter section 2 stopped. During this time, the user can contact the operator or someone else to ask for repair.

On the other hand, in cases where the driving mode is the maintenance mode (YES in S18), the inverter control section 53 commands the inverter section 2 to be driven again (S19). Upon receiving the control signal from the inverter control section 53, the inverter section 2 shifts from being stopped to being driven, whereby power (voltage) is supplied to the backlight 3 (S20).

Figure 6:
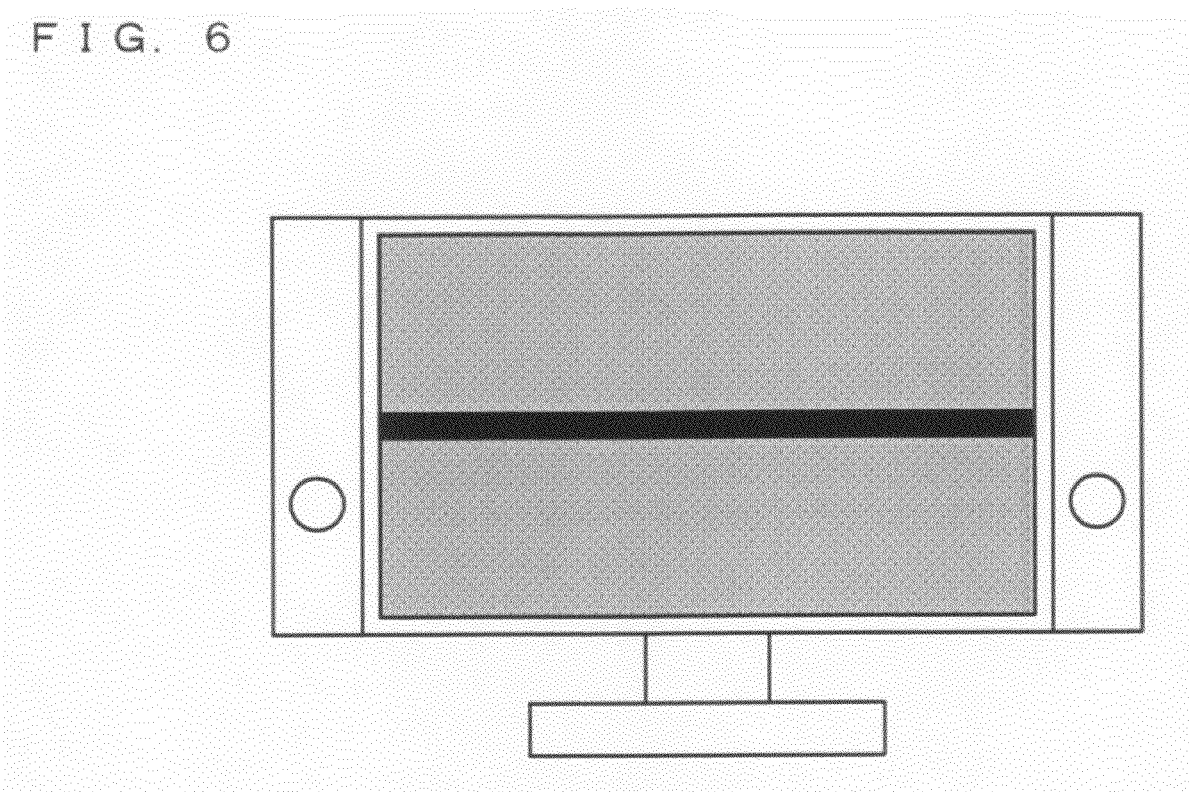
FIG. 6 illustrates an image that is displayed on a display panel of the liquid crystal display device.
Figure 7:
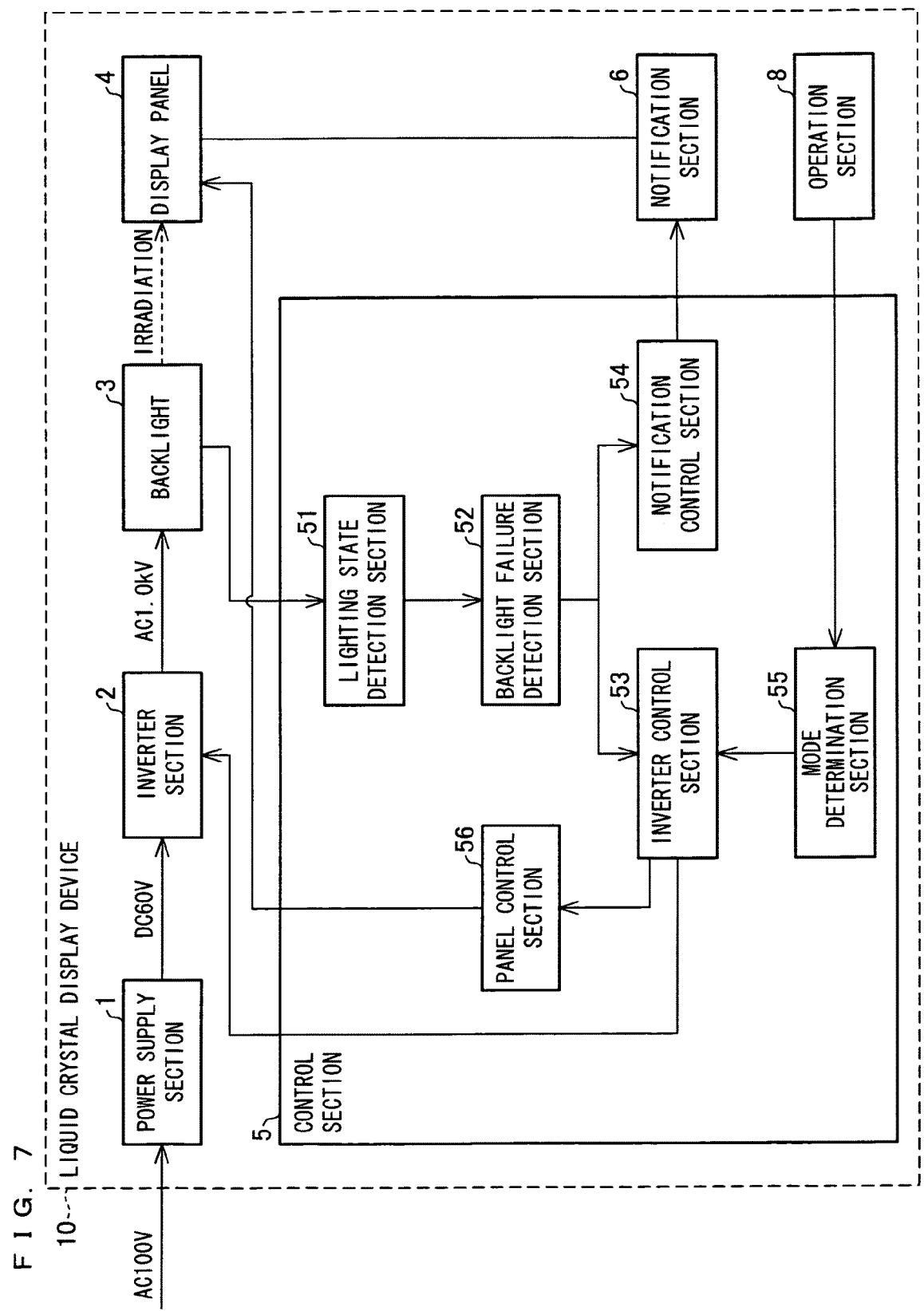
FIG. 7 is a block diagram illustrating another configuration of the liquid crystal display device of FIG. 1.

All this process results in lighting of normal fluorescent tubes other than a failed fluorescent tube such as a blown one. FIG. 6 illustrates an image that is displayed on the display panel 4 in such a case. As illustrated in FIG. 6, a black line indicative of the location of a failed fluorescent tube appears in a snowy noise display. This makes it possible to easily identify a failed fluorescent tube among a plurality of fluorescent tubes, thus enabling more efficient maintenance work than before.

The LED indicator provided in the display panel 4 is not limited to displaying any particular color, as long as the state of the backlight 3 is visible through a color displayed by the LED indicator.

(Operation Example 2 of the Liquid Crystal Display Device 10)

The following describes a configuration for more easily identifying a failed fluorescent tube such a blown one. In Operation Example 2, the liquid crystal display device 10 is configured to include the panel control section 56, which performs display control of the display panel 4 at the time of the maintenance mode, in addition to the configuration in Operation Example 1 where the inverter section 2 is forcibly driven at the time of the maintenance mode.

Specifically, the liquid crystal display device 10 is configured such that when the inverter section 2 is forcibly driven at the time of the maintenance mode, the panel control section 56 controls the display panel 4 so that the display panel 4 displays a white display screen image. This configuration is described below with reference to FIGS. 7 and 8 together with specific operation.

Figure 8:
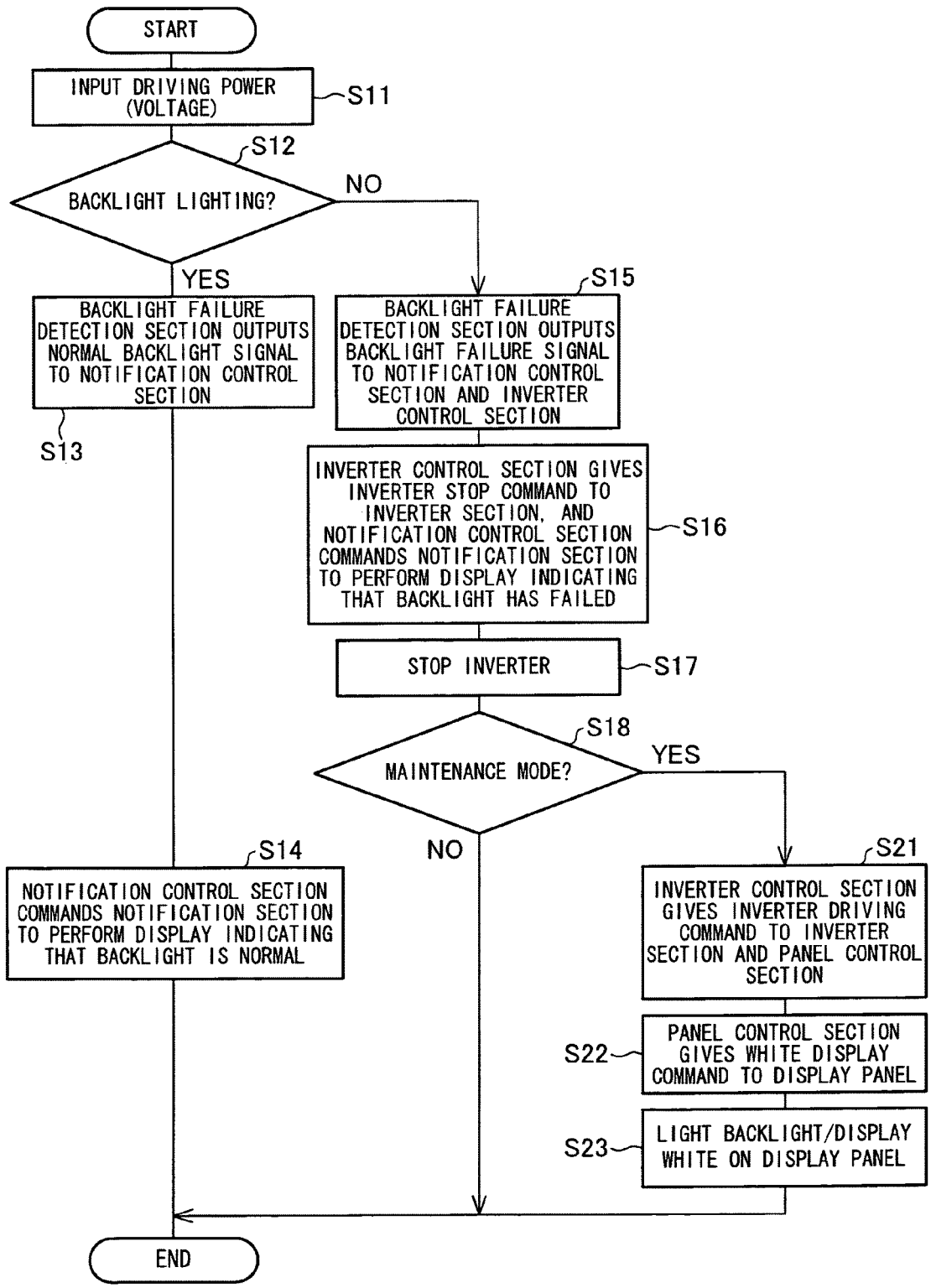
FIG. 8 is a process flow chart showing an example of operation (Operation Example 2) of the liquid crystal display device of FIG. 7.

FIG. 8 is a process flow chart showing an operation that the liquid crystal display device 10 performs in performing display control of the display panel 4. The steps S11 to S18 are the same as those shown above in the process flow of the liquid crystal display device 10 in Operation Example 1, and as such, are not detailed below.

First, the backlight 3 is supplied with a voltage from the power supply section 1 through the inverter section 2 (S11). At this point, in cases where the backlight 3 is not lighting (NO in S12), the backlight failure detection section 53 outputs a backlight failure signal to the notification control section 54 and the inverter control section 53 (S15). In response, the notification control section 54 commands the notification section 6 to notify outside that the backlight 3 is not lighting, while the inverter control section 53 commands the inverter section 2 to be stopped (S16). Upon receiving the control signal from the inverter control section 53, the inverter section 2 is stopped (S17).

Then, the mode determination section 55 determines whether the driving mode is the normal mode or the maintenance mode (S18). In cases where the driving mode is the maintenance mode (YES in S18), the inverter control section 53 commands the inverter section 2 to be driven again, and also sends a similar signal to the panel control section 56 (S21). Upon receiving the signal to drive the inverter section 2 again, the panel control section 56 commands the display panel 4 to display a white display screen image (S22). Upon receiving the control signal from the inverter control section 53, the inverter section 2 shifts from being stopped to being driven, whereby the backlight 3 lights. Then, the display panel 4 displays a white display screen image according to its shutter action (S23).

Figure 9:
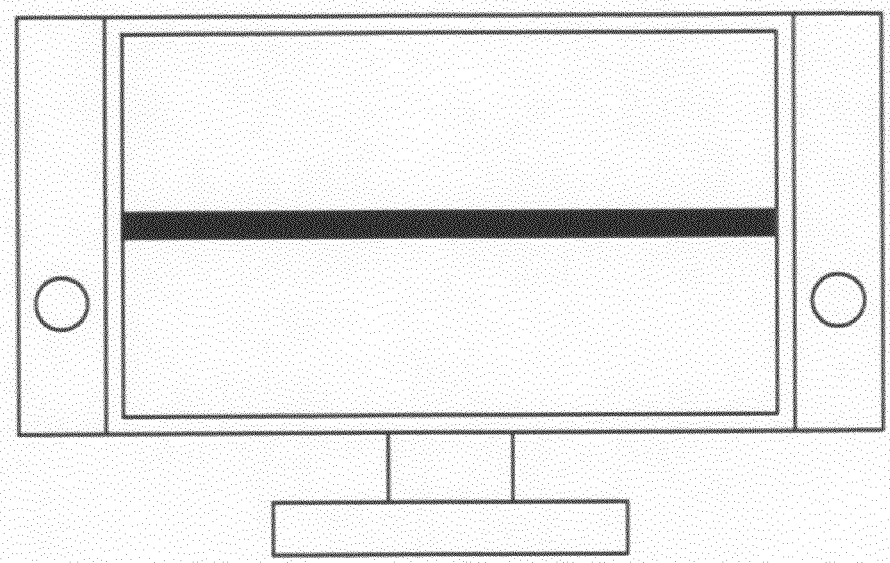
FIG. 9 illustrates an image that is displayed on a display panel of the liquid crystal display device of FIG. 7.
Figure 10:
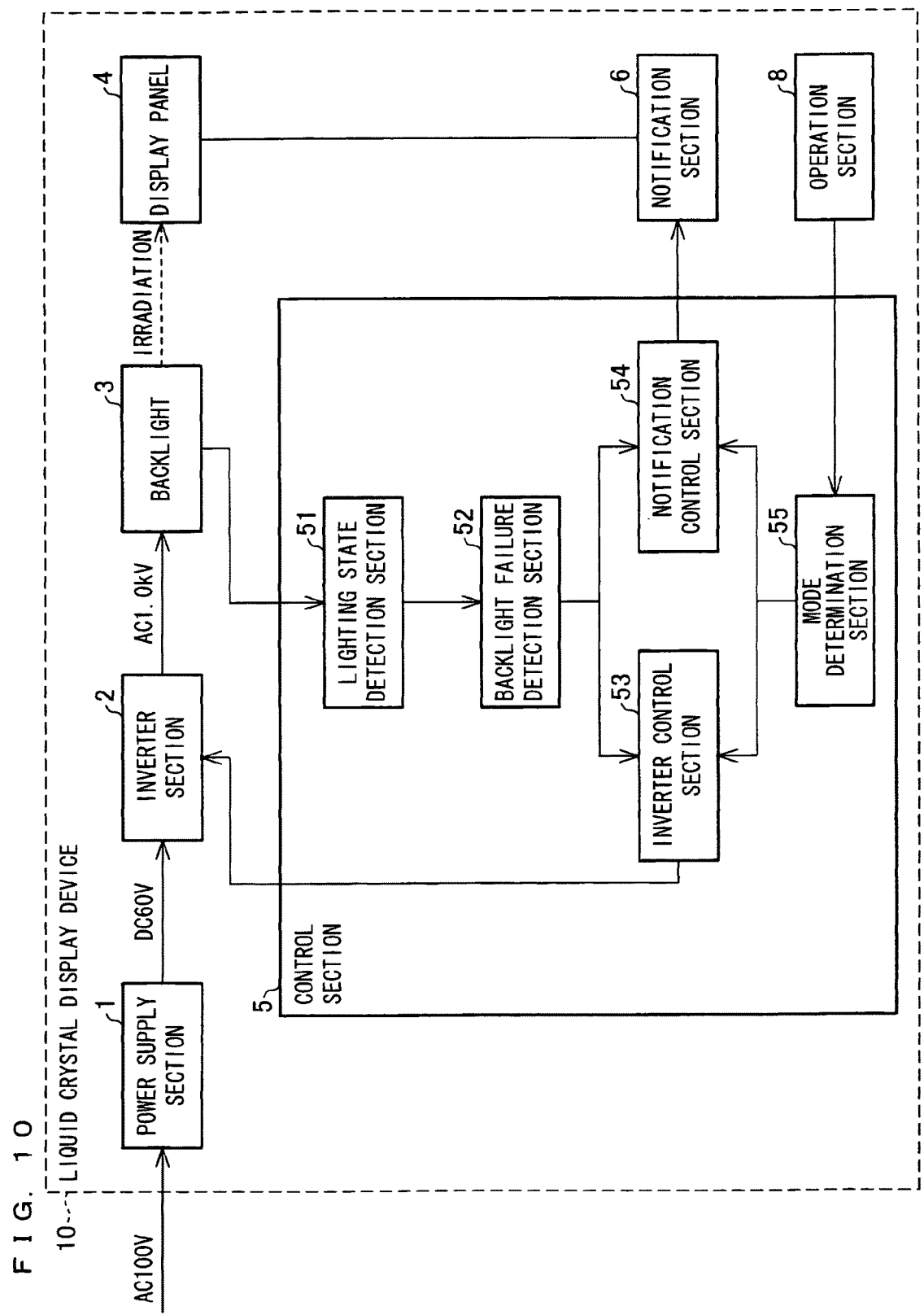
FIG. 10 is a block diagram illustrating another configuration of the liquid crystal display device of FIG. 1.

FIG. 9 illustrates an image that is displayed on the display panel 4 when such a process has been executed. As illustrated in FIG. 9, a black line indicative of the location of a failed fluorescent tube appears in a white display screen image. This makes it possible to easily identify a failed fluorescent tube among a plurality of fluorescent tubes.

The color of a display screen image is not limited to white, and only needs to be such a color as gray, red, or blue that a failed fluorescent tube can be identified. Further, a failed fluorescent tube may be identified by displaying an image through which the failed fluorescent tube is easily visible, as well as by changing the color of a display screen image as described above.

(Operation Example 3 of the Liquid Crystal Display Device 10)

The following describes another example of operation of the liquid crystal display device 10. In Operation Example 3, the liquid crystal display device 10 is configured such that the notification section 6 notifies outside of whether the current driving mode is the normal mode or the maintenance mode, in addition to the configuration in Operation Example 1.

Specifically, the liquid crystal display device 10 is configured such that in response to a result of determination from the mode determination section 55, the notification control section 54 commands the notification section 6 to notify outside of whether the driving mode is the normal mode or the maintenance mode. This configuration is described below with reference to FIGS. 10 and 11 together with specific operation.

Figure 11:
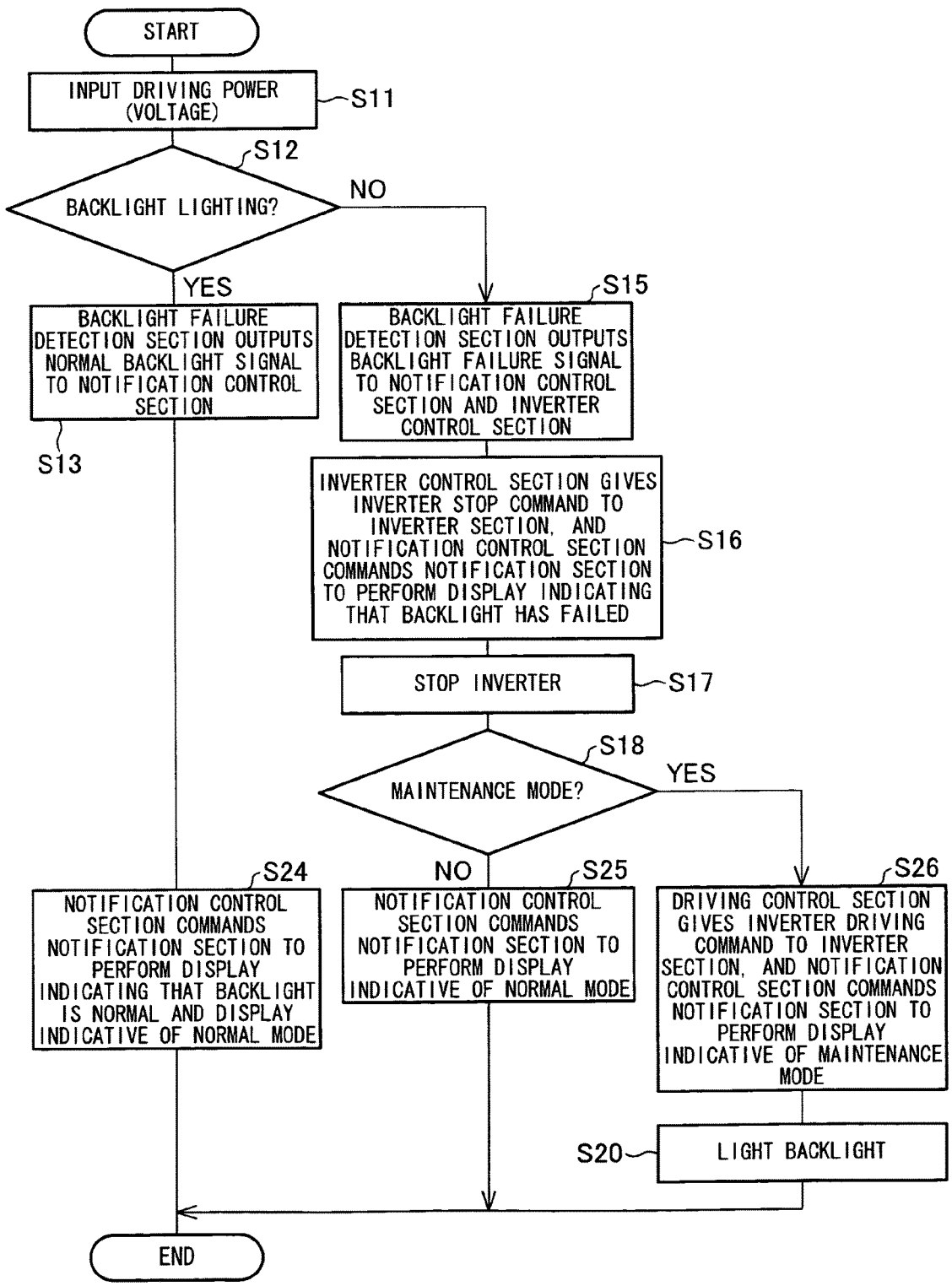
FIG. 11 is a process flow chart showing an example of operation (Operation Example 3) of the liquid crystal display device of FIG. 10.
Figure 12:
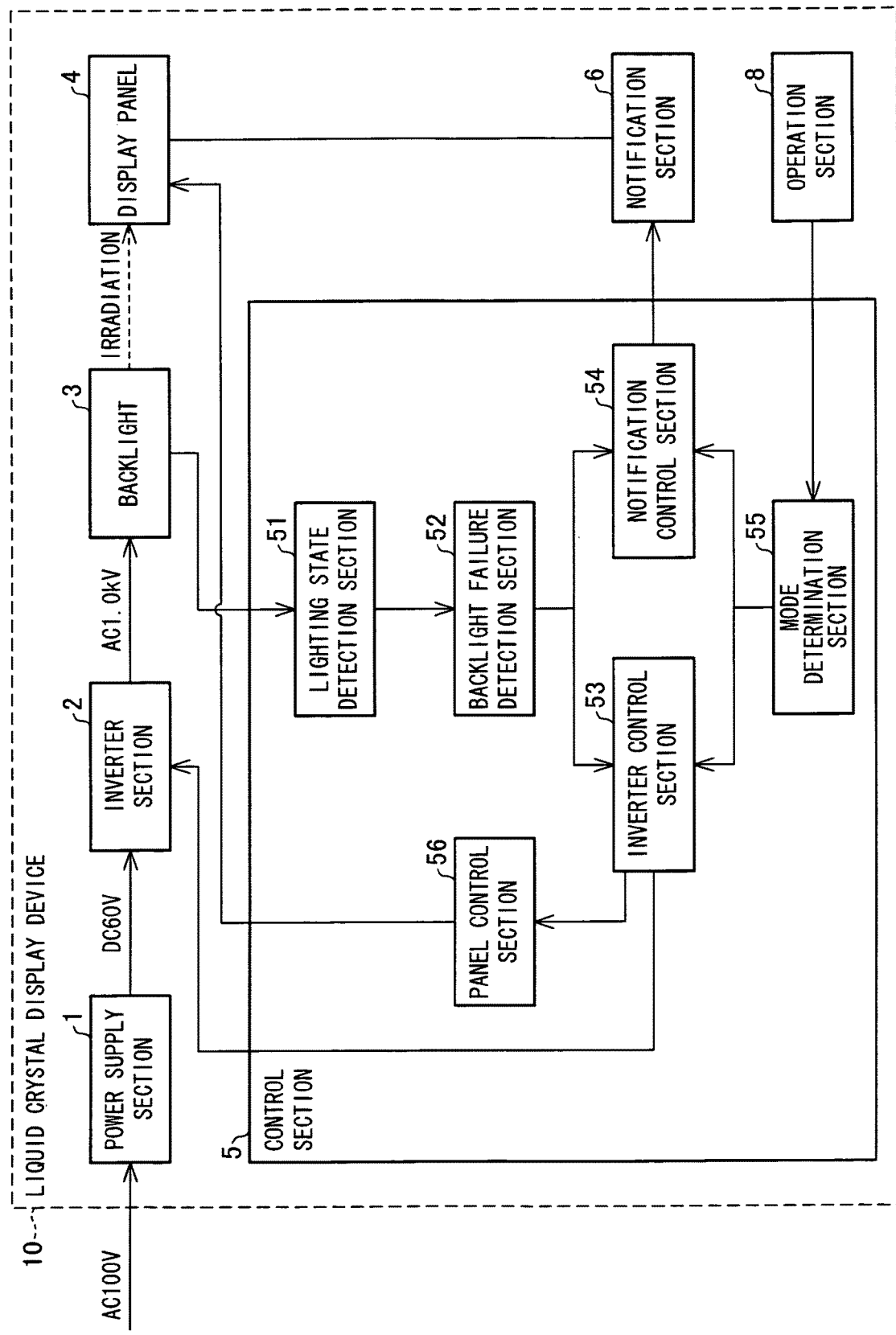
FIG. 12 is a block diagram illustrating another configuration of the liquid crystal display device of FIG. 1.

FIG. 11 is a process flow chart showing an operation that the liquid crystal display device 10 performs in notifying outside of the current driving mode. The steps S11 to S13 and S15 to S18 are the same as those shown above in the process flow of the liquid crystal display device 10 in Operation Example 1, and as such, are not detailed below.

First, the backlight 3 is supplied with a voltage from the power supply section 1 through the inverter section 2 (S11). At this point, in cases where the backlight 3 is lighting (YES in S12), the backlight failure detection section 52 outputs a normal backlight signal to the notification control section 54 (S13). Upon receiving the normal backlight signal, the notification control section 54 commands the notification section 6 to notify outside that the backlight 3 is lighting, and also commands the notification section 6 to notify outside that the driving mode is the normal mode (S24). Notification of the driving mode is made by the same means as the afore-mentioned notification indicating that the backlight 3 is lighting. For example, the notification control section 54 causes a second LED indicator (notification section 6) provided in the display panel 4 to perform a lighting process for indicating the driving mode is the normal mode or, specifically, a process for "lighting in blue". Alternatively, the notification control section 54 causes a notification section 6 having a display function to display a message indicating that the driving mode is the normal mode. This makes it possible to externally confirm that the driving mode is the normal mode.

On the other hand, in cases where the backlight 3 is not lighting (NO in S12), the backlight failure detection section 53 outputs a backlight failure signal to the notification control section 54 and the inverter control section 53 (S15). In response, the notification control section 54 commands the notification section 6 to notify outside that the backlight 3 is not lighting, while the inverter control section 53 commands the inverter section 2 to be stopped (S16). Upon receiving the control signal from the inverter control section 53, the inverter section 2 is stopped (S17).

Then, the mode determination section 55 determines whether the driving mode is the normal mode or the maintenance mode, and then outputs a determined result to the inverter control section 53 and the notification control section 54 (S18). In cases where the driving mode is the normal mode (NO in S18), the inverter control section 53 performs no process on the inverter section 2, while the notification control section 54 commands the notification section 6 to notify outside that the driving mode is the normal mode (S25).

On the other hand, in cases where the driving mode is the maintenance mode (YES in S18), the inverter control section 53 commands the inverter section 2 to be driven again, and the notification control section 54 commands the notification section 6 to notify outside that the driving mode is the maintenance mode (S26).

This makes it possible to notify outside of the current driving mode. This allows the user or operator to confirm that his/her operation has been surely accepted. In particular, since it can be confirmed that a shift has been surely made to the maintenance mode at the time of a failure in the backlight, an improvement in safety of maintenance work can be achieved.

(Operation Example 4 of the Liquid Crystal Display Device 10)

In Operation Example 3, a configuration for more easily identifying a failed fluorescent tube such a blown one can be applied, as in Operation Example 2. This configuration is described below as Operation Example 4. In Operation Example 4, the liquid crystal display device 10 is configured such that the panel control section 56 performs display control of the display panel 4 at the time of the maintenance mode, in addition to the configuration in Operation Example 3. This configuration is described below with reference to FIGS. 12 and 13 together with specific operation.

Figure 13:
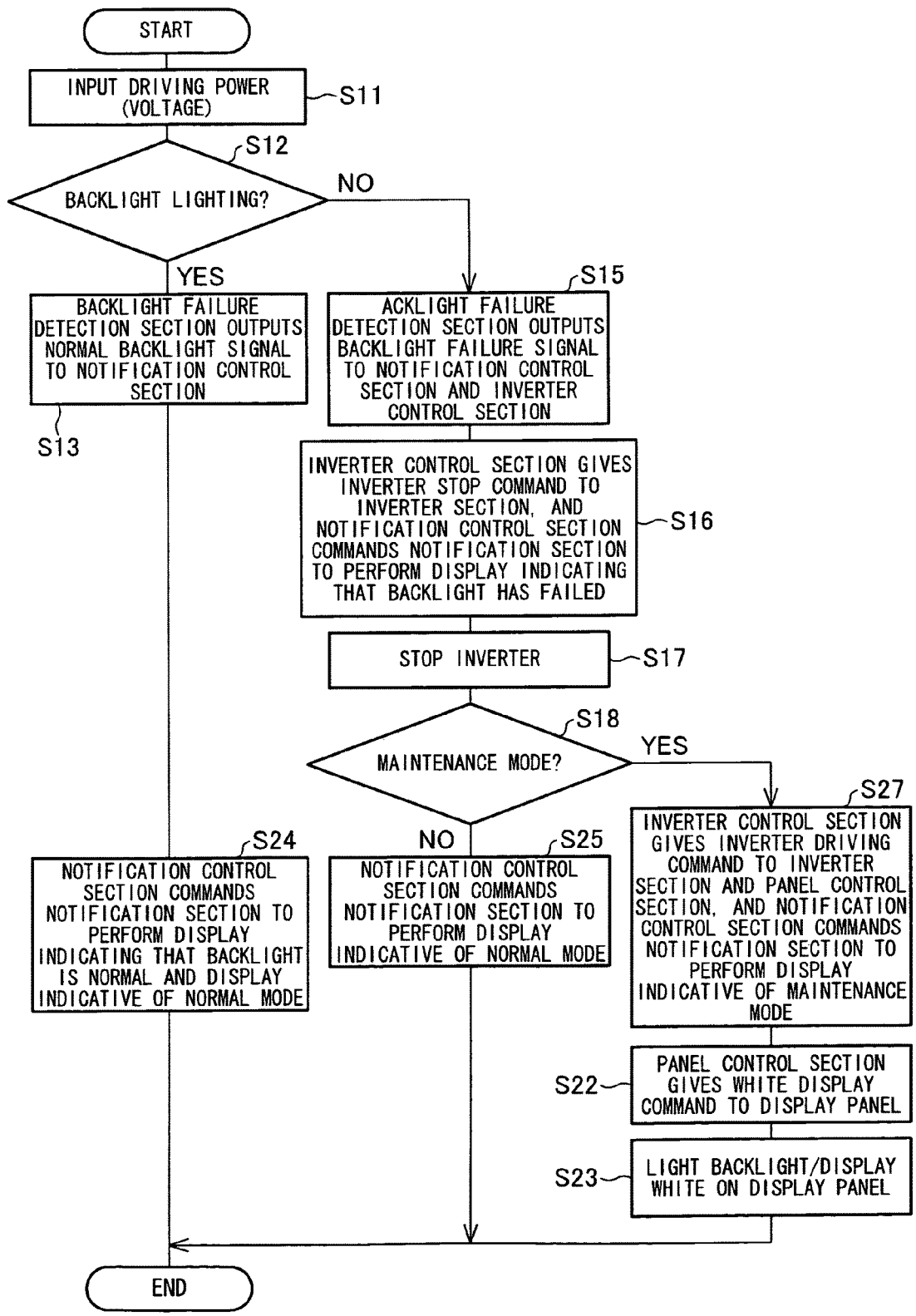
FIG. 13 is a process flow chart showing an example of operation (Operation Example 4) of the liquid crystal display device of FIG. 10.

FIG. 13 is a process flow chart showing an operation that the liquid crystal display device 10 performs in performing display control of the display panel 4. The steps S11 to S13, S15 to S18, and S24 are the same as those shown above in the process flow of the liquid crystal display device 10 in Operation Example 3, and as such, are not detailed below.

First, the backlight 3 is supplied with a voltage from the power supply section 1 through the inverter section 2 (S11). At this point, in cases where the backlight 3 is not lighting (NO in S12), the backlight failure detection section 53 outputs a backlight failure signal to the notification control section 54 and the inverter control section 53 (S15). In response, the notification control section 54 commands the notification section 6 to notify outside that the backlight 3 is not lighting, while the inverter control section 53 commands the inverter section 2 to be stopped (S16). Upon receiving the control signal from the inverter control section 53, the inverter section 2 is stopped (S17).

Then, the mode determination section 55 determines whether the driving mode is the normal mode or the maintenance mode, and then outputs a determined result to the inverter control section 53 and the notification control section 54 (S18). In cases where the driving mode is the normal mode (NO in S18), the inverter control section 53 performs no process on the inverter section 2, while the notification control section 54 commands the notification section to notify outside that the driving mode is the normal mode (S25).

On the other hand, in cases where the driving mode is the maintenance mode (YES in S18), the inverter control section 53 commands the inverter section 2 to be driven again, and also sends a similar signal to the panel control section 56, and the notification control section 54 commands the notification section 6 to notify outside that the driving mode is the maintenance mode (S27). Upon receiving the signal to drive the inverter section 2 again, the panel control section 56 commands the display section 4 to display a white display screen image (S22). Upon receiving the control signal from the inverter control section 53, the inverter section 2 shifts from being stopped to being driven, whereby the backlight 3 lights. Then, the display panel 4 displays a white display screen image (S23).

All this enables the user or operator to surely recognize the current driving mode and easily identify the fluorescent tubes at the time of the maintenance mode, thus enabling more efficient maintenance work.

Although the embodiment deals with the example where the present invention is applied to a liquid crystal device, the present invention can also be applied to a general transmissive display device in a similar manner.

Finally, the blocks of the liquid crystal display device 10, in particular, the lighting state detection section 51, the backlight failure detection section 52, the inverter control section 53, the notification control section 54, the mode determination section 55, and the panel control section 56 may be realized by hardware or can be realized by software with the use of a CPU as follows:

The liquid crystal display device 10 includes a CPU (central processing unit), a ROM (read only memory), a RAM (random access memory), and a memory device (memory medium) such as a memory. The CPU executes instructions in control programs for realizing each function. The ROM contains a program, the program is loaded on the RAM, and the memory device stores the program and various data. The objective of the present invention can also be achieved by mounting to the liquid crystal display device 10 a computer-readable storage medium storing control program codes (executable program, intermediate code program, or source program) for the liquid crystal display device 10, serving as software for realizing the foregoing respective functions, so that the computer (or CPU or MPU) retrieves and executes the program code stored in the storage medium.

The storage medium can be, for example, a tape, such as a magnetic tape or a cassette tape; a disk including (i) a magnetic disk such as a floppy (Registered Trademark) disk or a hard disk and (ii) an optical disk such as CD-ROM, MO, MD, DVD, or CD-R; a card such as an IC card (memory card) or an optical card; or a semiconductor memory such as a mask ROM, EPROM, EEPROM, or flash ROM.

Alternatively, the liquid crystal display device 10 can be arranged to be connectable to a communications network so that the program codes are delivered over the communications network. The communications network is not limited to a specific one, and therefore can be, for example, the Internet, an intranet, extranet, LAN, ISDN, VAN, CATV communications network, virtual private network, telephone line network, mobile communications network, or satellite communications network. The transfer medium which constitutes the communications network is not limited to a specific one, and therefore can be, for example, wired line such as IEEE 1394, USB, electric power line, cable TV line, telephone line, or ADSL line; or wireless such as infrared radiation (IrDA, remote control), Bluetooth (Registered Trademark), 802.11 wireless, HDR, mobile telephone network, satellite line, or terrestrial digital network. Note that, the present invention can be realized by a computer data signal which is realized by electronic transmission of the program code and which is embedded in a carrier wave.

The present invention is not limited to the description of the embodiments above, but may be altered by a skilled person within the scope of the claims. An embodiment based on a proper combination of technical means disclosed in different embodiments is encompassed in the technical scope of the present invention.

As described above, the display device according to the present invention is configured such that upon receiving, from the mode determination section, a signal indicating that the driving mode is the maintenance mode, after having stopped the inverter section due to a fact that at least one of the plurality of fluorescent tubes is not lighting, the inverter control section drives the inverter section again.

Further, as described above, the method according to the present invention for driving a display device is such a method that in the inverter controlling step, when a signal indicating, as determined in the mode determining step, that the driving mode is the maintenance mode is received after the inverter section has been stopped due to a fact that at least one of the plurality of fluorescent tubes is not lighting, the inverter section being driven again.

This enables the user or operator to easily identify a blown fluorescent tube with his/her eyes. Since a failed fluorescent tube can be easily identified while the backlight is not lighting, maintenance work can be made more efficient.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

A display device of the present invention is configured such that while a backlight is not lighting, fluorescent tubes are forced to light, whereby a failed fluorescent tube can be easily identified. As such, the display device of the present invention can be applied to a typical transmissive display device including a backlight having a plurality of fluorescent tubes.

The invention claimed is:

1. A display device comprising (i) a transmissive display panel, (ii) a backlight including a plurality of fluorescent tubes that irradiate the display panel with light, (iii) an inverter section that supplies a driving voltage to the backlight, and (iv) a control section that controls whether to drive or stop the inverter section and that stops the inverter section when at least one of the plurality of fluorescent tubes is not lighting, in which a display is carried out by controlling an amount of transmission of the light with which the display panel is irradiated by the backlight, said display device, further comprising:
a mode determination section that determines whether a driving mode of the display device is a normal mode in which to indicate a normal state of the display device or a maintenance mode in which to carry out maintenance work on the display device,
upon receiving, from the mode determination section, a signal indicating that the driving mode is the maintenance mode, after having stopped the inverter section due to a fact that at least one of the plurality of fluorescent tubes is not lighting, the inverter control section drives the inverter section again so that the inverter section works only for a predetermined period of time thereafter, thereby lighting all of the plurality of fluorescent tubes except the at least one of the plurality of fluorescent tubes not lighting.

2. The display device as set forth in claim 1, further comprising:
a lighting state detection section that detects a lighting state of the backlight;
a backlight failure detection section that judges, in accordance with a detected result of the lighting state detection section, whether or not the backlight has failed, and that outputs a signal according to a judged result; and
a panel control section that performs display control of the display panel in accordance with the judged result of the backlight failure detection section and a determined result of the mode determination section, wherein:
when at least one of the plurality of fluorescent tubes is not lighting, the backlight failure detection section outputs a backlight failure signal indicating that the backlight has failed; and
upon receiving the backlight failure signal from the backlight failure detection section and the signal indicative of the maintenance mode from the mode determination section, the panel control section controls the display panel so that the display panel displays a white display screen image.

3. The display device as set forth in claim 2, wherein the lighting state detection section judges the lighting state of the backlight by detecting an output voltage of a transformer in the inverter section, the output voltage being supplied to the backlight.

4. The display device as set forth in claim 2, wherein the lighting state detection section judges the lighting state of the backlight by detecting an amount of light with which the display panel is irradiated by the backlight.

5. The display device as set forth in claim 1, further comprising:
a lighting state detection section that detects a lighting state of the backlight;
a backlight failure detection section that judges, in accordance with a detected result of the lighting state detection section, whether or not the backlight has failed, and that outputs a signal according to a judged result;
a notification section that notifies outside of the lighting state of the backlight; and
a notification control section that gives a notification command to the notification section in accordance with an output signal supplied from the backlight failure detection section so as to cause the notification section to notify outside of the lighting state of the backlight,
when at least one of the plurality of fluorescent tubes is not lighting, the backlight failure detection section outputting a backlight failure signal indicating that the backlight has failed, and
upon receiving the backlight failure signal from the backlight failure detection section, the notification control section sending, to the notification section, a signal for causing the notification section to notify outside that the backlight has failed.

6. The display device as set forth in claim 5, wherein the notification section is constituted by an externally viewable indicator display.

7. The display device as set forth in claim 5, wherein the notification section is constituted by a speaker that produces a sound by which the lighting state of the backlight can be identified.

8. The display device as set forth in claim 1, further comprising:
a lighting state detection section that detects a lighting state of the backlight;
a backlight failure detection section that judges, in accordance with a detected result of the lighting state detection section, whether or not the backlight has failed, and that outputs a signal according to a judged result;
a notification section notifies outside of the lighting state of the backlight and whether the driving mode is the normal mode or the maintenance mode; and
a notification control section that gives a notification command to the notification section in accordance with an output signal supplied from the backlight failure detection section so as to cause the notification section to notify outside of the lighting state of the backlight and whether the driving mode is the normal mode or the maintenance mode,
when at least one of the plurality of fluorescent tubes is not lighting, the backlight failure detection section outputting a backlight failure signal indicating that the backlight has failed; and
upon receiving the backlight failure signal from the backlight failure detection section, the notification control section sending, to the notification section, a signal for causing the notification section to notify outside that the backlight has failed, and when the driving mode is the maintenance mode, the notification control section further sending, to the notification section, a signal for causing the notification section to indicate that the driving mode is the maintenance mode.

9. The display device as set forth in claim 1, wherein the display device is a liquid crystal display device.

10. A method for driving a display device,
said display device comprising (i) a transmissive display panel, (ii) a backlight including a plurality of fluorescent tubes that irradiates the display panel with light, and (iii) an inverter section that supplies a driving voltage to the backlight, in which a display is carried out by controlling an amount of transmission of the light with which the display panel is irradiated by the backlight,
said method comprising the steps of:
(a) controlling whether to drive or stop the inverter section, and of stopping the inverter section when at least one of the plurality of fluorescent tubes is not lighting; and
(b) determining whether a driving mode of the display device is a normal mode in which to indicate a normal state of the display device or a maintenance mode in which to carry out maintenance work on the display device,
in the step (a), when a signal indicating, as determined in the mode determining step, that the driving mode is the maintenance mode is received after the inverter section has been stopped due to a fact that at least one of the plurality of fluorescent tubes is not lighting, the inverter section being driven again so that the inverter section works only for a predetermined period of time thereafter, thereby lighting all of the plurality of fluorescent tubes except the at least one of the plurality of fluorescent tubes not lighting.

* * * * *